United States Patent [19]

Ito

[11] Patent Number: 5,262,978
[45] Date of Patent: Nov. 16, 1993

[54] IMAGE ENHANCEMENT SYSTEM

[75] Inventor: Shigehiro Ito, Toride, Japan

[73] Assignee: Victor Company of Japan, Ltd., Yokohama, Japan

[21] Appl. No.: 760,444

[22] Filed: Sep. 17, 1991

[30] Foreign Application Priority Data

Sep. 17, 1990 [JP] Japan .................................. 2-246717

[51] Int. Cl.$^5$ ............................................. G06G 7/02
[52] U.S. Cl. ................................................ 364/825
[58] Field of Search .................. 364/825, 724.01, 729, 364/752; 358/166, 162, 37, 160

[56] References Cited

U.S. PATENT DOCUMENTS

| | | | |
|---|---|---|---|
| 4,181,917 | 1/1980 | Richman | 358/36 |
| 4,183,051 | 1/1980 | Richman | 358/36 |
| 4,598,310 | 7/1986 | Brand et al. | 358/19 |
| 4,789,897 | 12/1988 | Koppeler et al. | 358/160 X |
| 4,951,127 | 8/1990 | Mehrgardt et al. | 358/28 |

Primary Examiner—Tan V. Mai
Attorney, Agent, or Firm—Jacobson, Price, Holman & Stern

[57] ABSTRACT

Signal components of the luminance signal are delayed by a 90° phase by a first filter and pass therethrough, where the closer the frequencies of the signal components to the upper limit frequency of the frequency bandwidth of the luminance signal, the less the signal components attenuated. The signal components also pass through a second filter, where the phase of the signal components do not change, the closer the frequencies of the signal components to the upper limit frequency of the frequency bandwidth, the less the signal components attenuated. The signal components that have a phase difference of 90° with respect to each other and that pass through each of the filters undergo vector composition to generate a signal that has an amplitude which is the root of the sum of the squares of the two amplitudes. A signal that has the same phase as the signal component that passes through the second filter and that has the same amplitude as the amplitude of the signal subjected to the vector composition is then generated. From this signal the signal component that passes through the second filter is subtracted to generate the edge emphasis component. This edge emphasis component is added to the luminance signal to emphasize the edge of an image.

2 Claims, 11 Drawing Sheets

GAIN = 1, |f| ≦ fo
GAIN = 0, |f| > fo

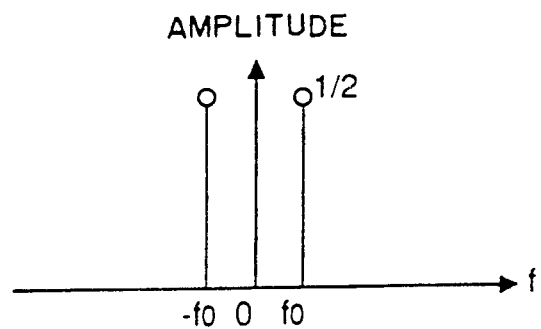
F I G. 6A
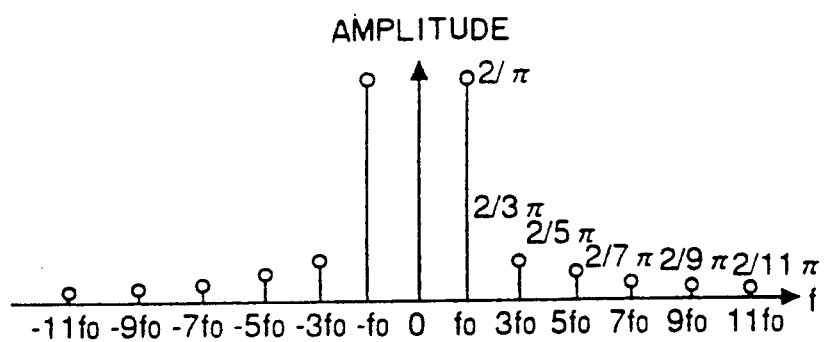
F I G. 6B

1

IMAGE ENHANCEMENT SYSTEM

BACKGROUND OF THE INVENTION

The present invention relates to an image enhancement system suitable for use in television (TV) receivers, video tape recorders (VTR), printers and other types of video apparatus, various types of image processing apparatus used for performing the recognition, measurement, quantification, diagnosis and other operations for images, as well as various types of data communication apparatus and the like.

Portion of an image which enhances the image is often an edge portion or a portion where the density changes, and the human eye moves towards these portions. Because of this, it is possible to improve the image quality by emphasizing these portions.

Conventionally, when image quality is improved, there is the method for improving the image quality where a secondary differential signal is made from an original signal such as a TV signal and the original and the secondary differential signals are overlapped to emphasize the edge portion.

For example, in the apparatus disclosed in U.S. Pat. No. 4,030,121 (Applied on: Dec. 2, 1975; Inventor: Yves C. Faroudja), an original signal such as a TV signal is differentiated by a first differentiator to form a first differential signal and this signal is differentiated by a secondary differentiator to form a secondary differential signal. The amplitude of this secondary differential signal is limited to a constant level by a limiter.

The first differential signal undergoes full-wave rectification by a full-wave rectifier and this full-wave rectified first differential signal and the amplitude limited secondary differential signal are multiplied together by a multiplier to form the component where the edge is emphasized.

The edge-emphasized component is added to the original signal by an adder to form a TV signal where the edge is emphasized.

However, the full-wave rectified first differential signal is included as an unwanted ripple component in the edge-emphasized TV signal to distort the TV signal.

This distortion becomes a cause of deterioration of the image quality. Accordingly, with a conventional image enhancement system, if there is too much edge emphasis, the edge emphasis for improving the image quality conversely acts to deteriorate the image quality and it is extremely difficult to adjust the amount of the edge-emphasized component.

SUMMARY OF THE INVENTION

The object of the present invention is to provide a signal shaping apparatus that can add an edge-emphasized component only to an input signal without addition of an unnecessary component.

In order to attain the objective described above, the present invention provides a signal shaping apparatus that emphasizes the rise and the fall of an input signal which has signal components in a frequency bandwidth set beforehand.

The apparatus comprises first filter means for delaying by a 90° phase the signal components and outputting the 90° phase-delayed components as first signals, wherein the closer the signal components to the upper limit frequency of the frequency bandwidth, the less the signal components attenuated, second filter means for outputting the signal components as second signals, wherein the closer the signal components to the upper limit frequency of the frequency bandwidth, the less the signal components attenuated, signal composition means for performing vector composition of the first and second signals and outputs a third signal having the amplitude which is the root of the square of amplitudes of the first and second signals, signal shaping means for outputting a fourth signal which has the same phase as that of the second signal and the same amplitude as that of the third signal, signal subtraction means for subtracting the second signal from the fourth signal to output rise/fall emphasis components of the input signal, and signal addition means for adding the emphasis components to the input signal to emphasize rise/fall of the input signal.

Other objects and advantages of the present invention will become apparent from the detailed description to follow taken in conjunction with the appended claims.

BRIEF DESCRIPTION OF THE DRAWINGS

FIGS. 3(a) to 3(g) is a view showing the waveform of signals that undergo signal processing in each section of the apparatus shown in FIG. 1;

FIG. 6A and 6B are views showing the respective spectrum distributions of the signal prior to and after signal processing by the apparatus shown in FIG. 1;

FIGS. 7(a) to 7(g) is a view showing each of the waveforms of signals, undergone signal processing by the apparatus shown in FIG. 1, having a frequency of one half of the frequency of the signals shown in FIG. 3;;

FIGS. 8(a) to 8(g) is a view showing each waveform shown in FIG. 3, whose timing is made to correspond to that of each waveform shown in FIG. 7;

FIGS. 9(a) to 9(g) is a view showing each waveform when a pulse signal undergoes signal processing by the apparatus shown in FIG. 1;

FIGS. 10(a) to 10(g) is a view showing each waveform when a signal including a leading edge undergoes signal processing by the apparatus shown in FIG. 1.

DETAILED DESCRIPTION OF THE PREFERRED EMBODIMENTS

Figure 1:
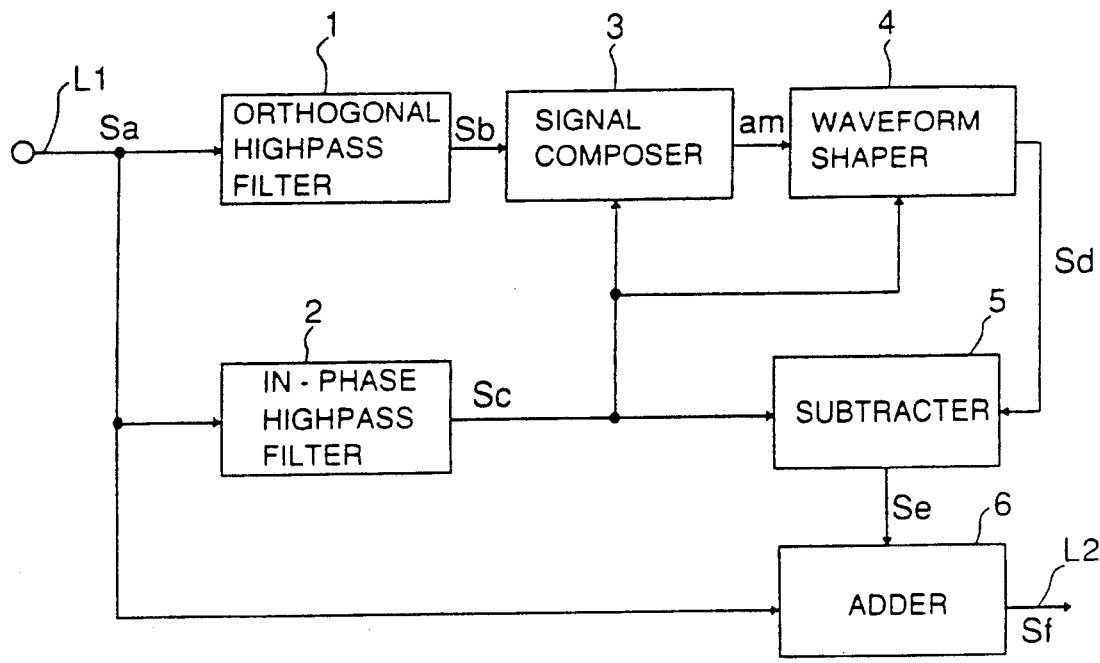
FIG. 1. is a block diagram of an embodiment of a signal shaping apparatus according to the present invention.

FIG. 1 is a block diagram of an embodiment of a signal shaping apparatus according to the present invention.

This signal shaping apparatus includes an orthogonal high-pass filter 1, an in-phase high-pass filter 2, a signal composer 3, a waveform shaper 4, a subtracter 5 and an adder 6. For convenience of description, the description of delay in signals due to the processing time of each of the circuits and delay circuits which perform compensation for this delay is omitted.

Figure 2:
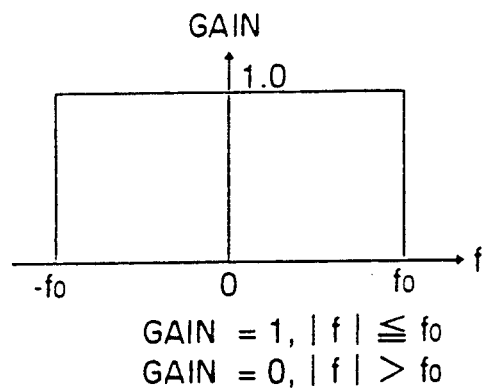
FIG. 2 is a view describing, in modeling, a transmission characteristic to which an input signal to be enhanced in the present invention has been subjected.

The description below will be for the case where as shown in FIG. 2, an input signal $S_a$ that coming from a line L1 has been subjected to a transmission characteristic shown in FIG. 2, and band limited by an upper limit frequency $f_0$ (approx. 4 MHz). In TV signals, a luminance signal is substantially equivalent to this input signal.

At first, the input signal $S_a$ is assumed as a cosine wave expressed by the following, as shown in FIG. 3(a).

$$S_a(t) = \cos(2\pi f_0 t) \qquad (1)$$

Figure 4:
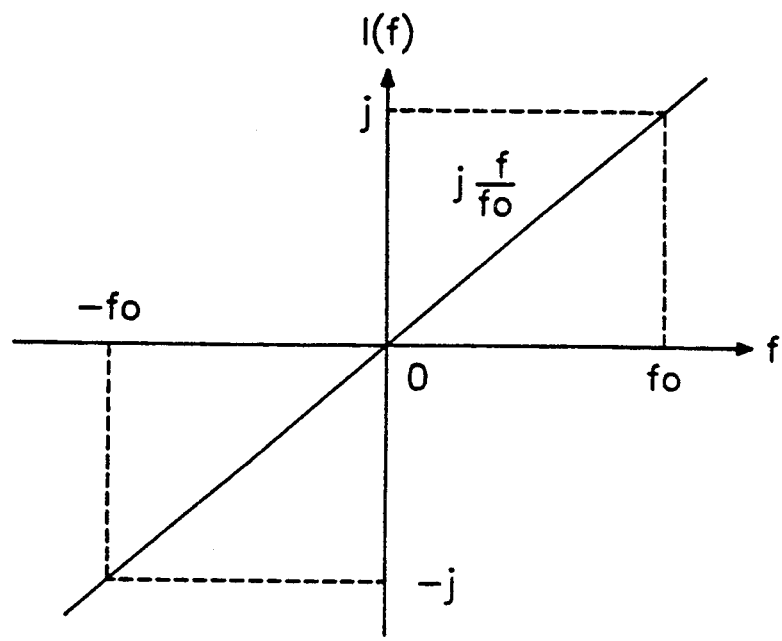
FIG. 4 is a view showing the frequency characteristics of an orthogonal highpass filter 1 in the apparatus shown in FIG. 1.

This input signal $S_a$ is supplied to the orthogonal high-pass filter 1. The characteristics of the orthogonal high-pass filter 1 is shown in FIG. 4 and the imaginary number portion of the frequency characteristic is expressed by $$I(f) = -jf/f_0 \qquad (2)$$

and the real number portion becomes zero. The orthogonal high-pass filter 1 is of an origin symmetrical transversal filter or the like utilizing either an analog or a digital circuit.

Figure 3:
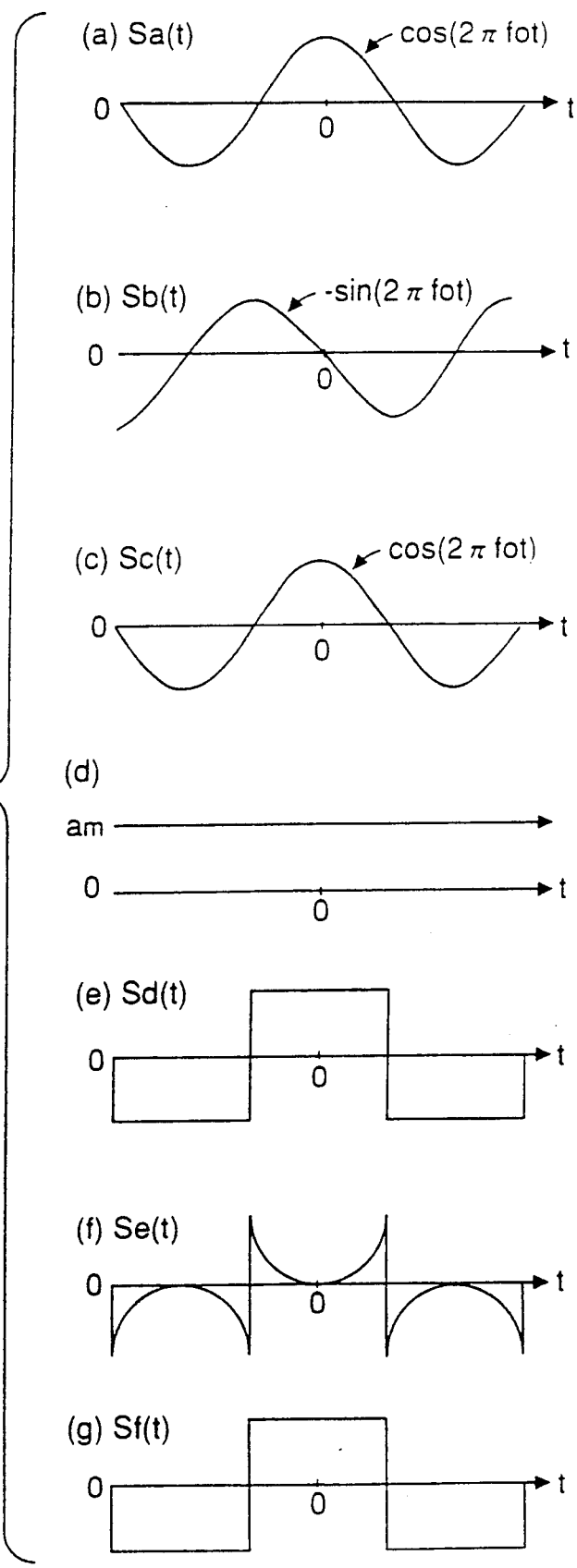
FIG. 3 comprising

FIG. 3 (b) is a view showing the output waveform of the orthogonal high-pass filter 1, and is expressed as $$S_b(t) = -\sin(2\pi f_0 t) \qquad (3)$$

which is a sine wave.

Figure 5:
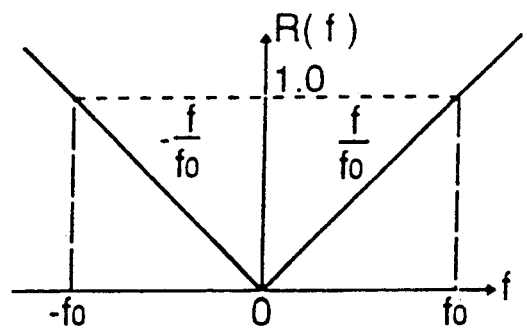
FIG. 5 is a view showing the frequency characteristics of an in-phase highpass filter 2 in the apparatus shown in FIG. 1.

On the other hand, the input signal $S_a$ is also supplied to the in-phase high-pass filter 2. The characteristics of the in-phase high-pass filter 2 is shown in FIG. 5 and the real number portion of the frequency characteristic becomes $$R(F) = |f/f_0| \qquad (4)$$

while the imaginary number portion becomes zero. The in-phase high pass filter 2 uses a transversal filter or the like that has a symmetrical coefficient value with respect to the time=0 axis, and utilizes either an analog circuit or a digital circuit.

The orthogonal high-pass filter 1 and the in-phase high-pass filter 2 have the same amplitude characteristic G (f) which is $$\begin{aligned} G(f) &= \sqrt{R(f)^2 + I(f)^2} \\ &= |f/f_0| \end{aligned} \qquad (5)$$

and the two characteristics are such that their phases are $\pi/2$ different from each other, and mutually intersecting.

The characteristics shown in FIG. 4 has a value in the imaginary number portion, and what has that characteristics is called an orthogonal highpass filter, while the characteristics shown in FIG. 5 has a value in the real number portion, and what has that characteristics is called an in-phase highpass filter.

An output signal of the in-phase high-pass filter 2 is a cosine wave shown in FIG. 3 (c) and which is expressed by $$S_c(t) = \cos(2\pi f_0 t) \qquad (6)$$

Each of the output signals $S_b(t)$ and $S_c(t)$ of the orthogonal high-pass filter 1 and the in-phase high-pass filter 2 are supplied to the signal composer 3. In the signal composer 3, vector composition between the orthogonal component and the in-phase component in accordance with the following equation (7) is performed to determine the square root am of the sum of the squares of the two signals $S_b(t)$ and $S_c(t)$.

$$am = \sqrt{(S_b(t))^2 + S_c(t)^2} \qquad (7)$$

The value of am shown in FIG. 3(d) is "1".

The signal composer 3 can be realized by a multiplier, an adder and a non-linear type amplifier. For example, when a digital circuit is used, the signal composer 3 is realized by a circuit of table look-up type where data that has been calculated beforehand is written to a ROM or the like, and then the output of the signal composer 3 can be obtained by referring to the data.

Then, the output signal $S_c(t)$ of the in-phase high-pass filter 2 and the signal that has the amplitude value am and which is from the signal composer 3, are supplied to the waveform shaper 4. Then, as described by equation (8), the waveform shaper 4 composes a new signal that has the amplitude of am, and the positive, zero and negative polarities which are in agreement with those of $S_c(t)$.

$$S_d(t) = \text{sgn}(S_c(t)) \cdot am \qquad (8)$$

where sgn (x) is a function assuming $+1$, 0 and $-1$ when x is positive, zero and negative, respectively.

The output signal $S_d(t)$ of the waveform shaper 4 becomes an orthogonal wave shown in FIG. 3 (e) and that has an amplitude of 1.

The waveform shaper 4 can be realized by a comparator and a multiplier. For example, when a digital circuit is used, the waveform shaper 4 is realized by a circuit of table look-up type having a positive-negative inverter circuit and a ROM.

The output signal $S_c(t)$ of the in-phase high-pass filter 2 and the output signal $S_d(t)$ of the waveform shaper 4 are supplied to the subtracter 5. Then the subtracter 5 subtracts the signal $S_c(t)$ from the signal $S_d(t)$ and outputs the signal $S_e(t)$ shown in FIG. 3 (f).

$$\begin{aligned} S_e(t) &= S_d(t) - S_c(t) \\ &= \text{sgn}(S_c(t)) \cdot am - S_c(t) \end{aligned} \qquad (9)$$

This signal $S_e(t)$ is the edge emphasis component.

The adder 6 adds the edge emphasis component $S_e(t)$ to the input signal $S_a(t)$ and outputs the signal $S_f(t)$ expressed by the following equation (10).

$$S_f(t) = S_a(t) + S_c(t) \quad (10)$$

The output signal $S_f(t)$ has an ideal orthogonal waveform where the edge emphasis component has been suitably added to the inclined portion of the input signal $S_a(t)$. Of course, there is no addition of unnecessary components other than the edge emphasis component in the output signal $S_f(t)$. In addition, the amplitude of the output signal $S_f(t)$ is characteristic in that it is the same as the amplitude of the input signal $S_a(t)$.

When the output signal $S_f(t)$ and the input signal $S_a(t)$ are subjected to Fourier transformation and their spectrum distributions are compared, it is clear that there are differences between the two signals. FIG. 6A is the spectrum distribution of the input signal $S_a(t)$ shown in FIG. 3 (a) and FIG. 6B is the spectrum distribution of the input signal $S_f(t)$ shown in FIG. 3 (g).

FIG. 6A shows that the spectrum exists only at the frequency $f = f_0$ and FIG. 6B shows that the spectrum exists at the frequency of $f = f_0$ and odd multiples thereof. The input signal $S_a(t)$ is the signal that is bandwidth limited in the frequency region of $f_0$ or less. FIG. 6B, therefore, shows that this processing of the signal shaping apparatus appends frequency components outside the bandwidth to the input signal $S_a(t)$.

This signal shaping apparatus appends frequency components (edge emphasis components) which exist other than the frequency bandwidth of the input signal $S_a(t)$ to the input signals $S_a(t)$ so that there is an improvement in sharpness and resolution.

Figure 7:
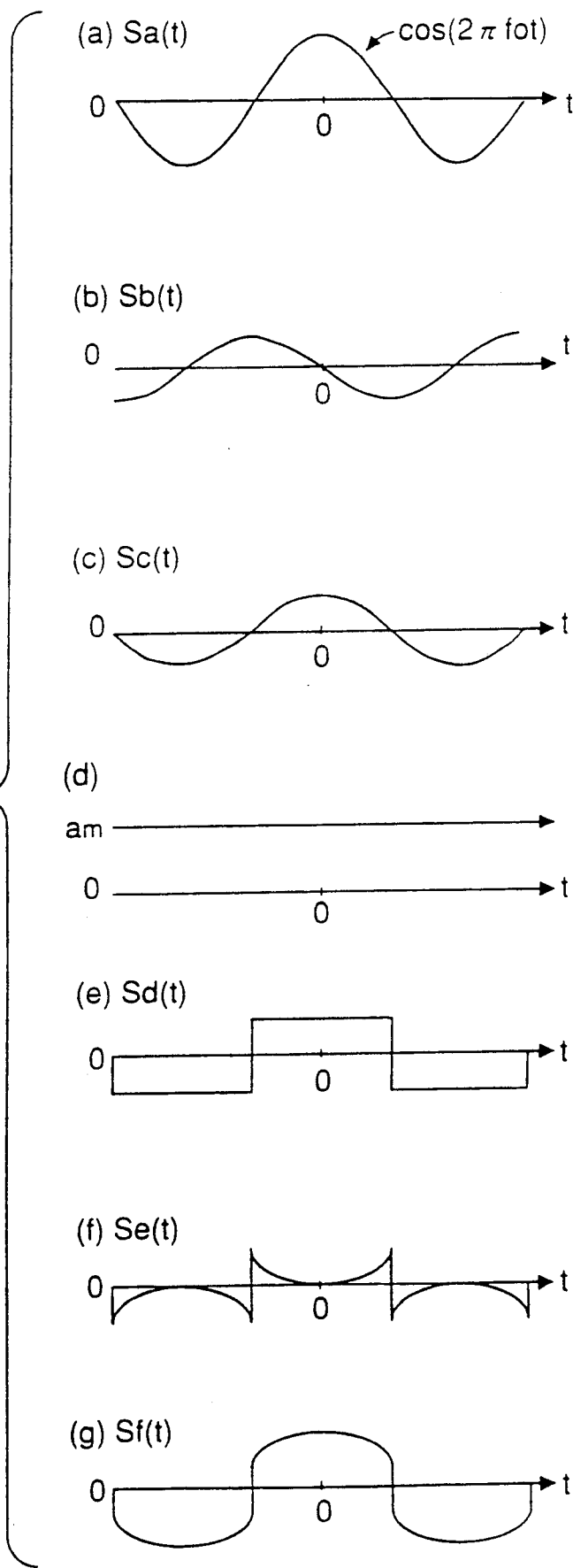
FIG. 7 comprising

Then, FIGS. 7 (a) through (g) show waveforms for the case where the input signal $S_a(t)$ is a cosine wave and the frequency f is $$f = f_0/2 \quad (16)$$

The measurement timing of FIGS. 7 (a) through (g) corresponds to the respective measurement timing of (a) through (g) of FIG. 3.

The amplitude of the edge emphasis component shown in FIG. 7 (f) is half that of the amplitude of the edge emphasis component shown in FIG. 3 (f). Because of this, as shown in FIG. 7 (g), the edge emphasis effect (image quality improvement effect) is reduced by half when compared to the case shown in FIG. 3 (g).

Figure 8:
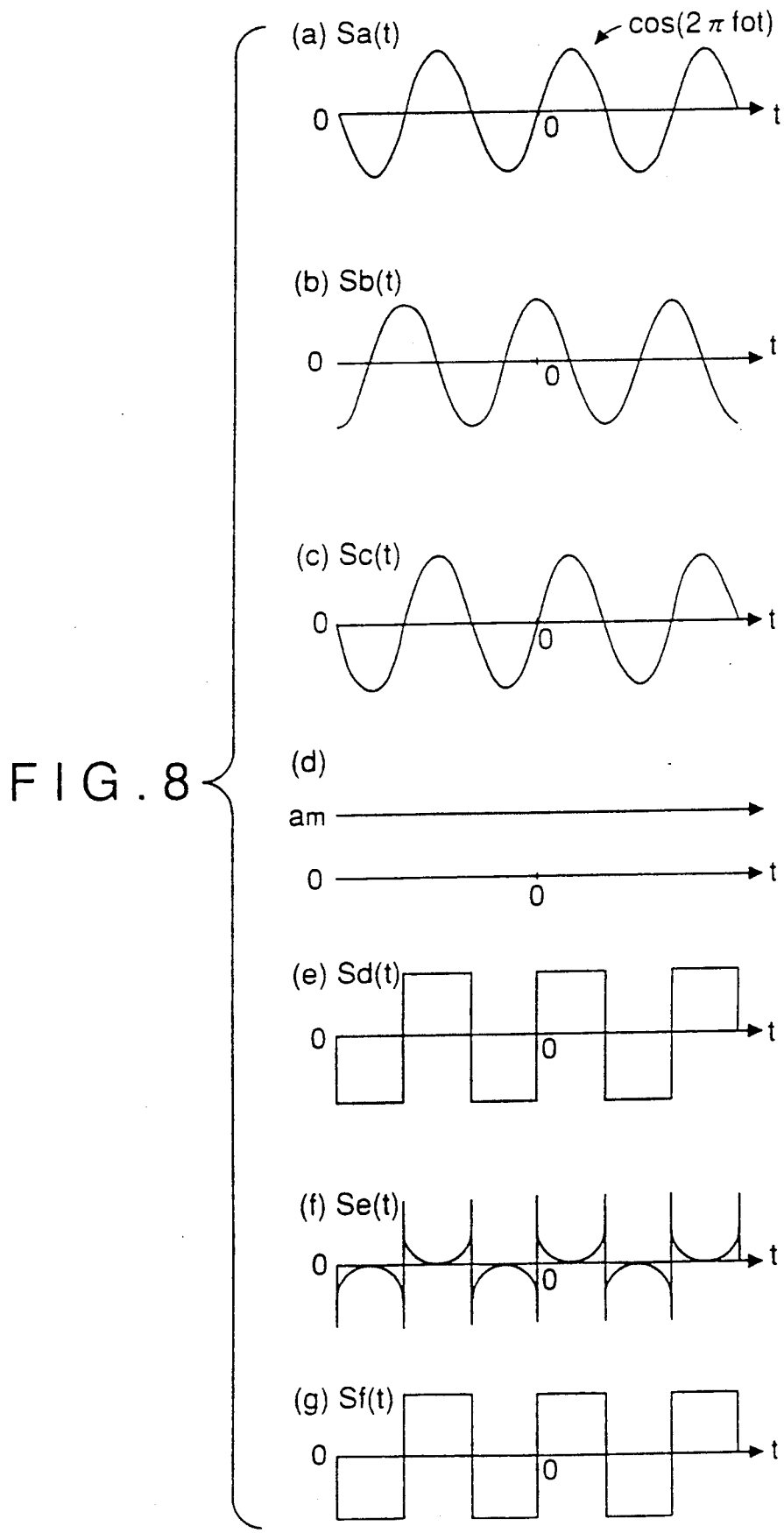
FIG. 8 comprising

Here, when FIG. 3 is rewritten to correspond to the time gap on the time axis of FIG. 7, it becomes as shown in FIG. 8, and when FIG. 7 and FIG. 8 are compared, the difference between $f = f_0$ and $f = f_0/2$ becomes even more clear.

In this manner, the edge emphasis component that is created by the signal shaping apparatus of the present embodiment has a frequency characteristic and is proportional to the frequency of the input signal. Accordingly, the edge emphasis effect (image quality improvement effect) due to this signal shaping apparatus becomes smaller for the lower the frequency of the input signal. This characteristic is a necessary condition in order to improve the sharpness and the resolution without the viewer being aware of an unnaturalness when the input signal is such as an image signal.

Figure 9:
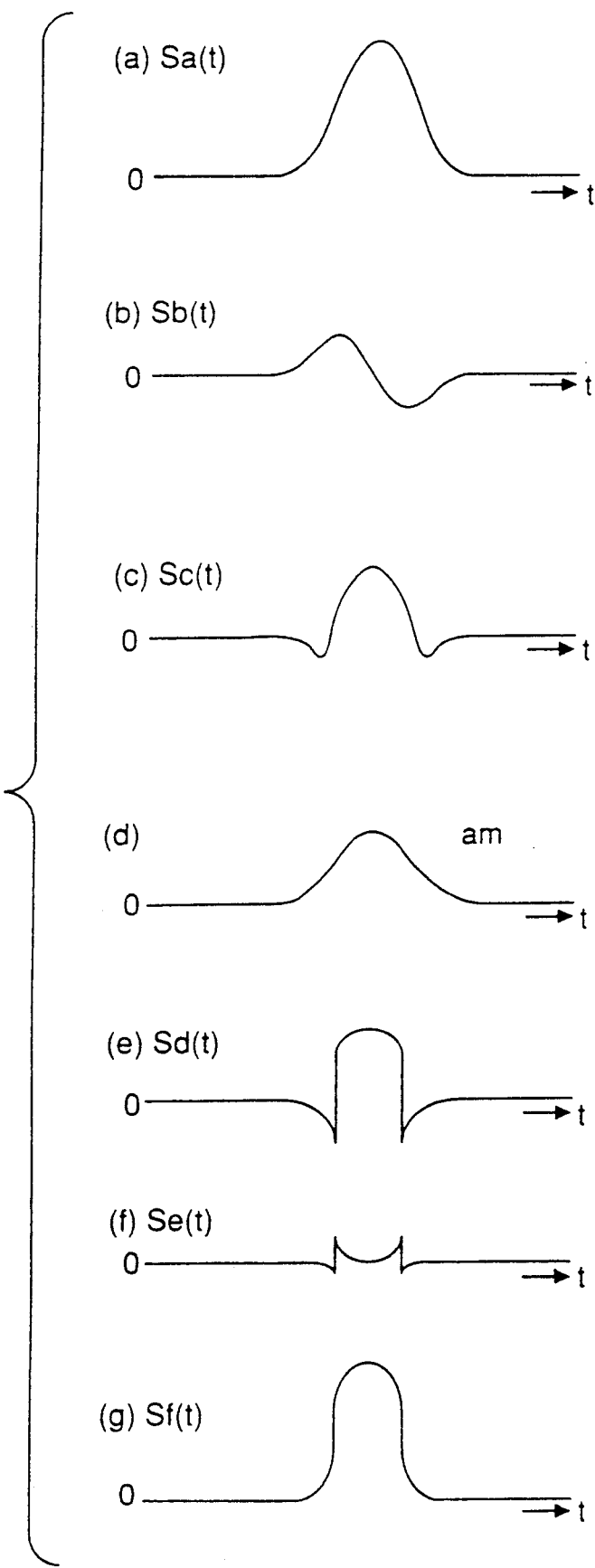
FIG. 9 comprising

FIGS. 9(a) through (g) show waveforms for the case when the input signal $S_a(t)$ is the pulse signal shown in FIG. 9 (a). The measurement timing of (a) through (g) of FIG. 9 corresponds to the measurement timing of (a) through (g) of FIG. 3, respectively.

Figure 10:
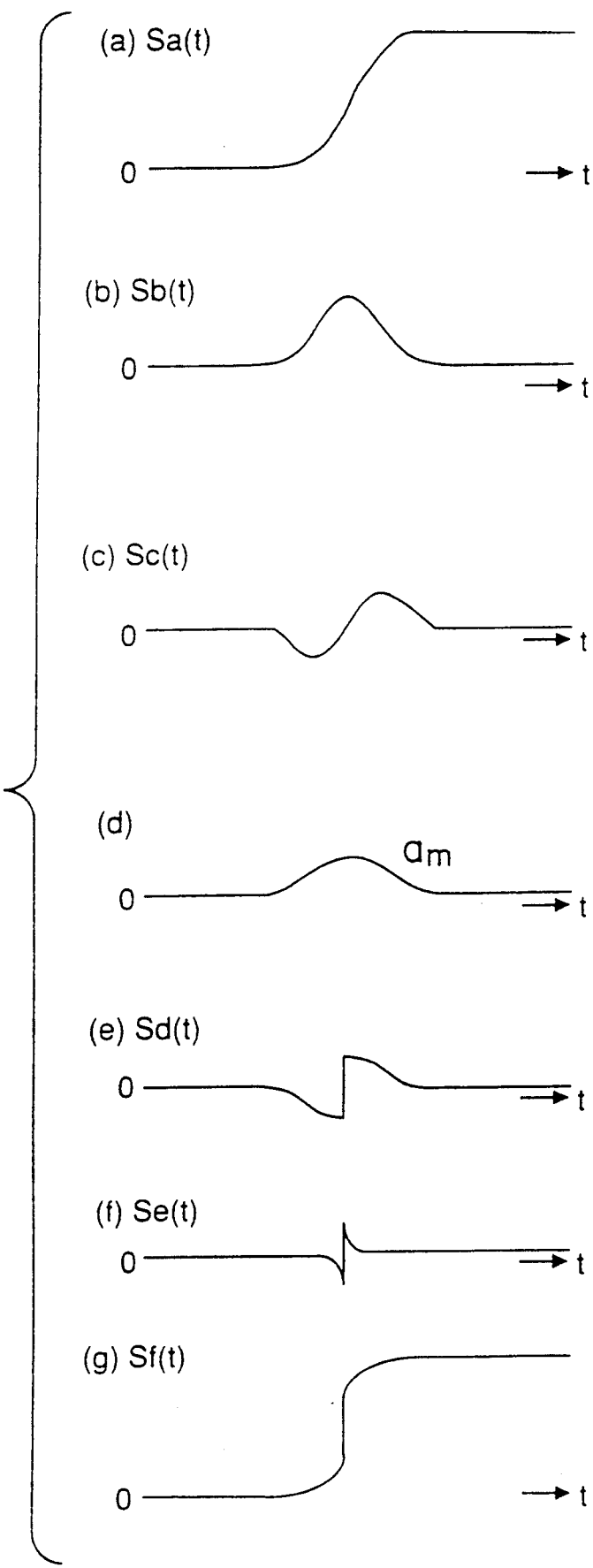
FIG. 10 comprising

FIGS. 10(a) through (g) show waveforms for the case when the input signal $S_a(t)$ is the signal that include a leading edge such as that shown in FIG. 10 (a). The measurement timing for (a) through (g) of FIG. 10 also corresponds to the measurement timing of (a) through (g) of FIG. 3, respectively.

There is a clear edge emphasis effect for each of the cases shown in FIG. 9 and FIG. 10, and there is a sufficient improvement in the image quality.

Figure 11A:
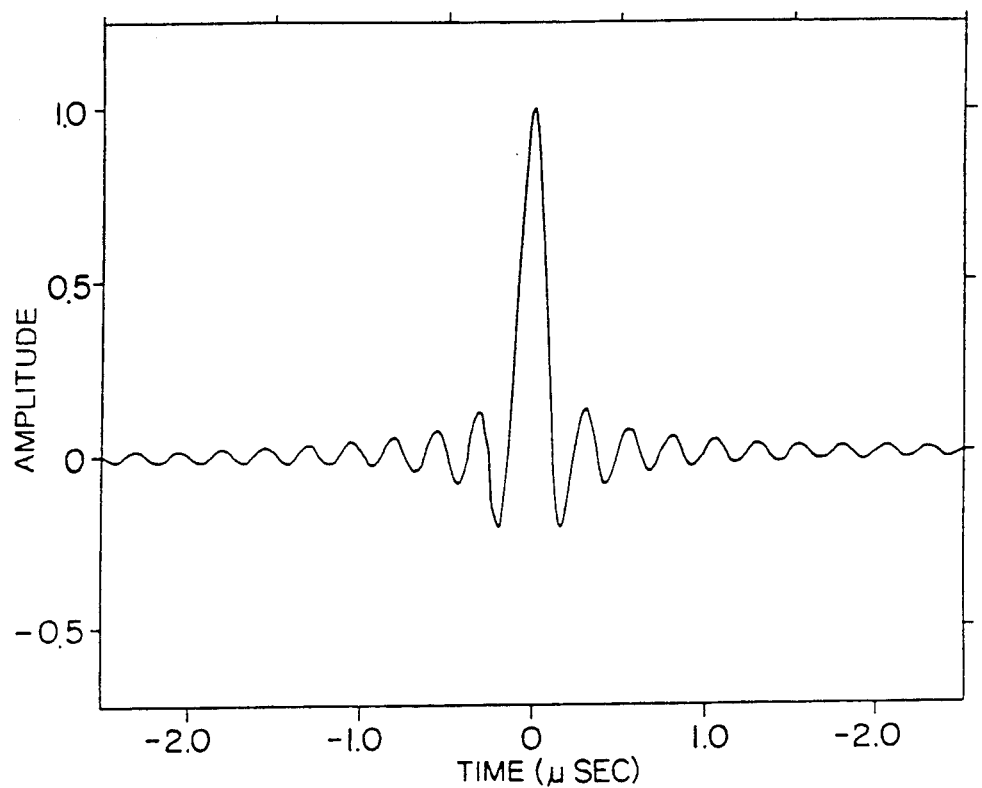
FIGS 11A and 11B are views describing the signal waveforms of an impulse response through the transmission characteristic shown in FIG. 2, and of the output signal from the apparatus shown in FIG. 1 when the above impulse response is input, respectively.

FIG. 11A shows a waveform for the signal that is expressed by the following equation and that is an impulse response through the transmission characteristic shown in FIG. 2.

$$S_a(t) = \frac{\sin(2\pi f_0 t)}{2\pi f_0 t} \quad (17)$$

Figure 11B:
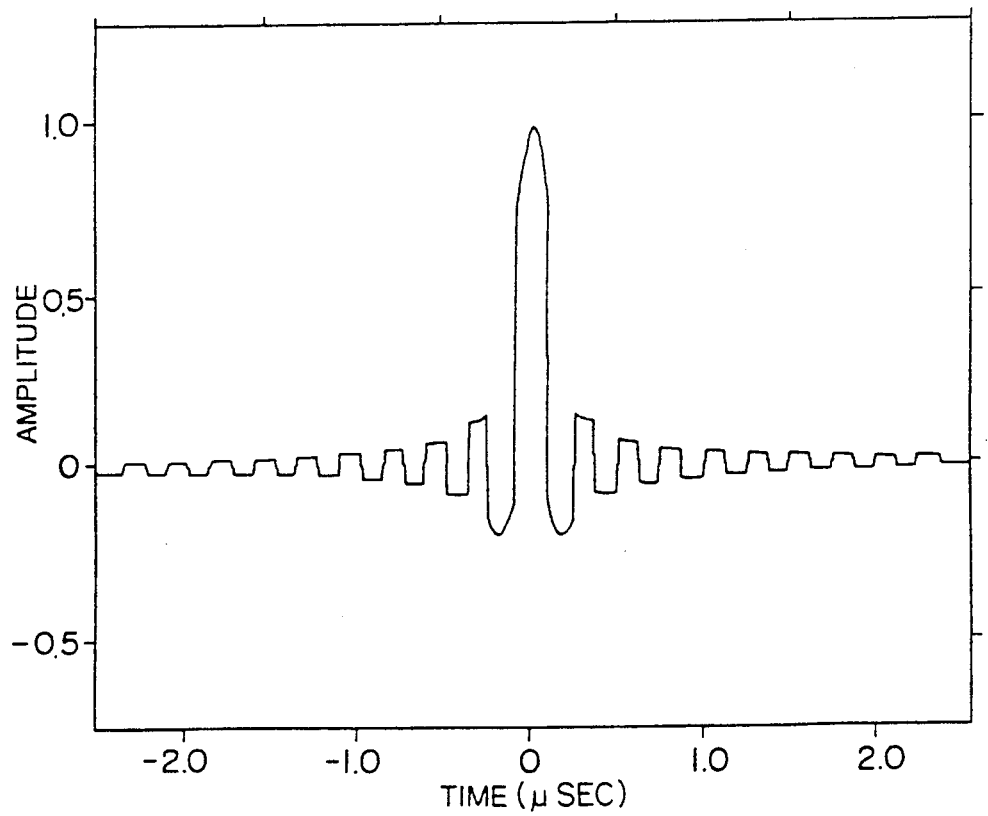

FIG. 11B shows a waveform of the output signal when the signal of FIG. 11A is input to the image quality improvement apparatus of the present embodiment. In FIG. 11B, it can be seen that not only no central pulse portion, but ringing portions also have a shape close to rectangular, and that components included in other than the bandwidth of the input signal have been sufficiently appended to the input signal so as to improve the image quality. The frequency of the edge emphasis component is proportional to the frequency of the input signal and so this signal shaping apparatus improves the sharpness and the resolution without the viewer being aware of an unnaturalness.

In addition, each of the elements configuring the present invention can be configured from combinations of conventional circuits and so it is possible to easily realize the present invention and for it to have a wide range of uses.

Figure 12:
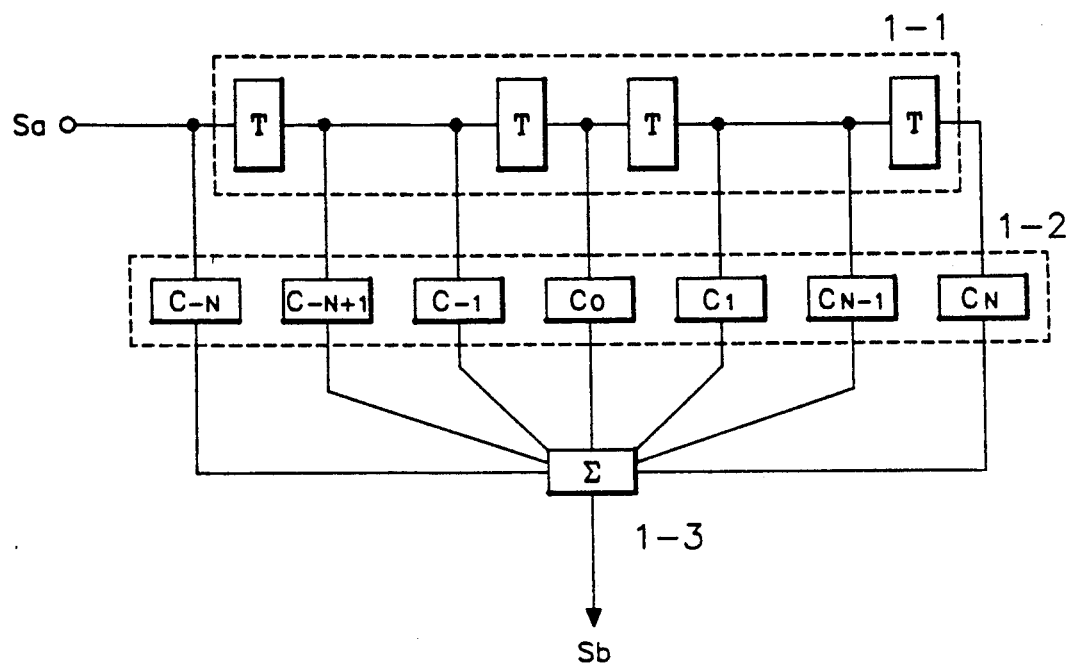
FIG. 12 illustrates an exemplary orthogonal highpass filter.

The following is a description of the conventional circuits which can make up the orthogonal high pass filter 1 and the signal composer 3:

A conventional example of the orthogonal highpass filter 1 is illustrated in FIG. 12, which shows an orthogonal filter composed of blocks 1-1, 1-2 and 1-3.

The block 1-1 consists of 2N (N: a positive integer) number of delay circuits connected in series. Each delay circuit has a delay time of T which is, for instance, ¼fsc (fsc: the color subcarrier of about 3.58 MHz).

The block 1-2 consists of 2N+1 number of multipliers having weighing factors Cn (n = −N to N) which are applied to the input signal Sa of the block 1-1 and the output signals therefrom.

Furthermore, the block 1-3 is an adder by which the output signals of the block 1-2 are added to and combined with each other, to output the signal Sb.

Figure 13:
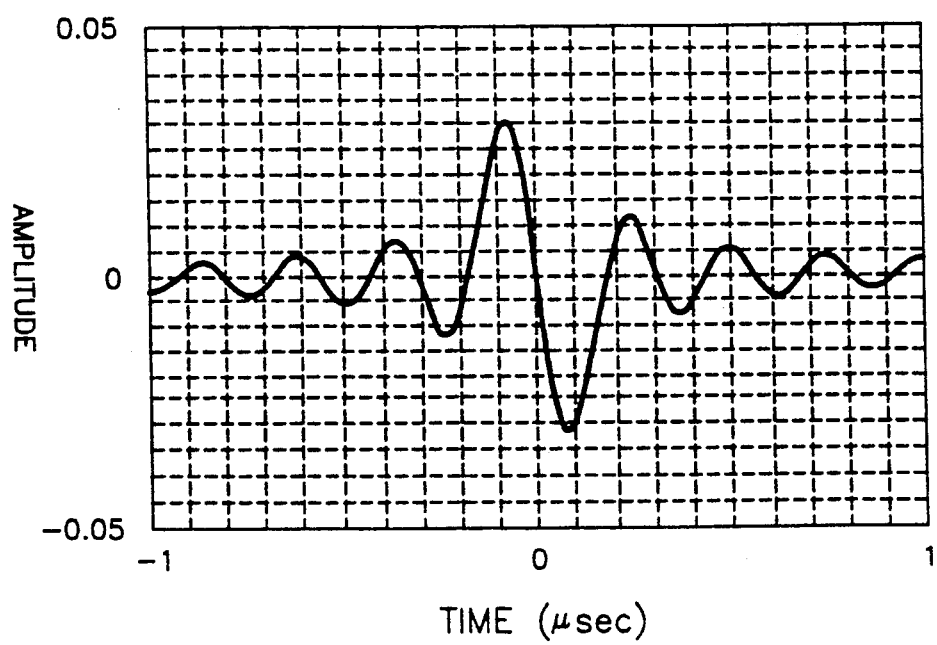
FIG. 13 graphically illustrates the impulse response of the exemplary orthogonal highpass filter of FIG. 12.

The 2N+1 number of factors Cn are determined in accordance with FIG. 13 which shows the impulse response of the orthogonal highpass filter 1 having the frequency characteristic shown in FIG. 4. The following equations can be established among the factors Cn:

C0 = 0, Cn + C−n = 0 and $$\sum_{n=-N}^{N} Cn = 0,$$

where f0(the upper limit frequency) = 4 MHz

Figure 14:
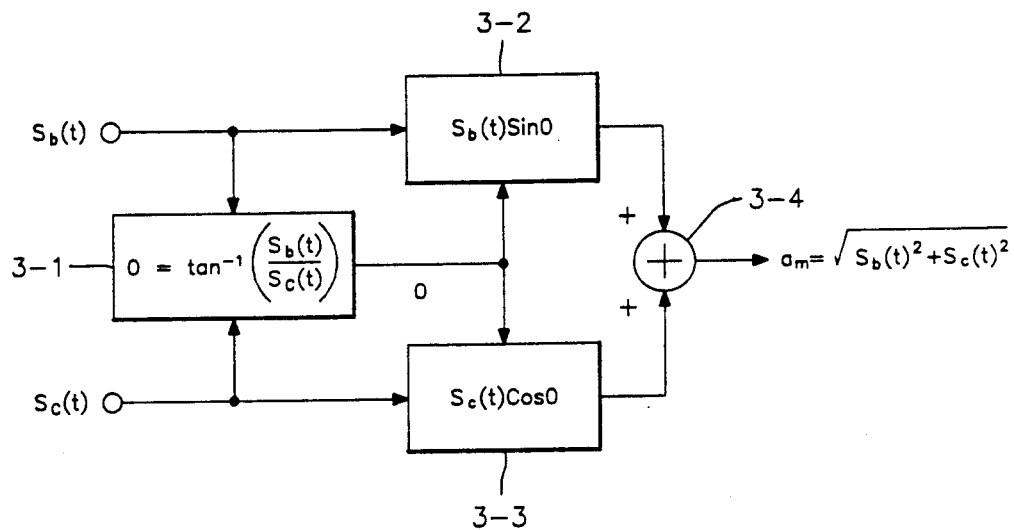
FIGS. 14 and 15 illustrate two exemplary signal composers.
Figure 15:
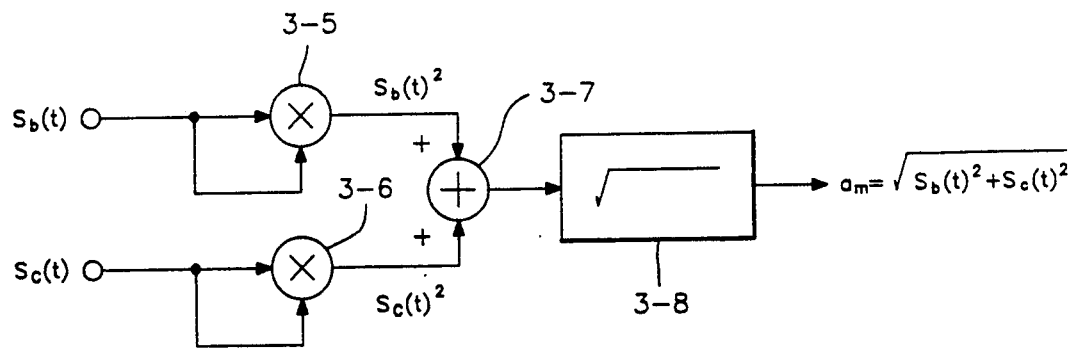

Two conventional examples of circuit diagrams for the signal composer 3 are shown in FIGS. 14 and 15. In FIG. 5(a), an angle Θ which is $$\Theta = \tan^{-1}(S_b(t)/S_c(t)) \quad (18)$$

where the signals $S_b(t)$ and $S_c(t)$ are respectively set in axes of ordinate and abscissas, is determined by a block 3-1.

A block of 3-2 determines a product of the signal $S_b$ multiplied by $\sin\Theta$, that is $$S_b(t) \cdot \sin\Theta = S_b(t)^2 / \sqrt{S_b(t)^2 + S_c(t)^2} \qquad (19)$$

Furthermore, a block 3-3 determines a product of the signal $S_c$ multiplied by $\cos\Theta$, that is $$S_c(t) \cdot \cos\Theta = S_c(t)^2 / \sqrt{S_b(t)^2 + S_c(t)^2} \qquad (20)$$

The signal having the amplitude value am expressed by the equation (7) is then determined by adding the results of the equations (19) and (20) to each other by an adder 3-4.

In FIG. 15, $S_b(t)^2$ and $S_c(t)^2$ are respectively determined by multipliers 3-5 and 3-6 and are added to each other by an adder 3-7. The square root of the addition is determined by a block 3-8.

Moreover, in the above description, the input signal is the luminance signal of the TV signal but the input signal can be the color signal of the TV signal, or primary color signals for each of the RGB colors.

The uses of the signal shaping apparatus of the present invention are not limited to TV receivers, as the present invention can find application in video tape recorders (VTR), printers and other types of video apparatus, various types of image processing apparatus used for performing the recognition, measurement, quantification, diagnosis and other operations for images. Application to data communications apparatus is also possible in order to improve the eye pattern.

What is claimed is:

1. A signal shaping apparatus for emphasizing transition portions of an input signal which has signal components in a specific frequency band, comprising:

means for delaying the phase of the input signal by $\pi/2$ to output a $\pi/2$ phase-delayed input signal as a first signal, the means for delaying having an output amplitude characteristic such that the closer the signal components are to the upper limit frequency of the frequency band, the less the signal components attenuate;

means for outputting a second signal, wherein the means for outputting has an output amplitude characteristic such that the closer the signal components are to the upper limit frequency of the frequency band, the less the signal components attenuate;

means for performing vector composition of the first and second signals to obtain the square root of the sum of the squares of the amplitudes of the first and second signals to output a third signal having an amplitude corresponding to said square root;

means connected to the means for outputting the second signal and also connected to the means for performing vector composition of the first and second signals, for combining the second and third signals to output a fourth signal having the same phase as that of the second signal and the same amplitude as that of the third signal;

a subtracter for subtracting the second signal from the fourth signal to output a transition portion emphasis signal; and an adder for adding the transition portion emphasis signal to the input signal to thereby emphasize the transition portions of the input signal.

2. A signal shaping apparatus according to claim 1, wherein the means for outputting the second signal has the same output amplitude characteristic as the means for delaying, so that the second signal has the same amplitude as and a phase shifted $\pi/2$ from that of the first signal.

* * * * *